United States Patent [19]
Beming et al.

[11] Patent Number: 5,740,537
[45] Date of Patent: Apr. 14, 1998

[54] METHOD AND CIRCUITRY FOR SELECTIVELY PERMITTING COMMUNICATION IN A MULTI-USER COMMUNICATION SYSTEM

[75] Inventors: Per Johan Beming, Stockholm; Carl Magnus Frodigh, Kista; Knut Magnus Almgren, Sollentuna, all of Sweden

[73] Assignee: Telefonaktiebolaget L M Ericsson (publ)

[21] Appl. No.: 594,348

[22] Filed: Jan. 30, 1996

[51] Int. Cl.⁶ .................................................. H04Q 7/20
[52] U.S. Cl. .................................................. 455/450; 455/63
[58] Field of Search .................................. 455/422, 436, 455/446, 447, 449, 63, 62, 443, 450–452, 9, 524, 67.1, 67.3, 510, 517

[56] References Cited

U.S. PATENT DOCUMENTS

| | | | |
|---|---|---|---|
| 4,736,453 | 4/1988 | Schloemer | 455/33 |
| 5,093,924 | 3/1992 | Toshiyuki et al. | 455/33 |
| 5,148,548 | 9/1992 | Meche et al. | 455/34.1 |
| 5,203,011 | 4/1993 | Bane et al. | 455/34.1 |
| 5,203,012 | 4/1993 | Patsiokas et al. | 455/34.1 |
| 5,276,908 | 1/1994 | Koohgoli et al. | 455/34.1 |
| 5,345,597 | 9/1994 | Strawczynski et al. | 455/34.1 |
| 5,396,648 | 3/1995 | Patsiokas et al. | 455/34.1 |
| 5,423,066 | 6/1995 | Sasuta | 455/34.1 |
| 5,448,761 | 9/1995 | Ushirokawa | 455/62 |
| 5,475,864 | 12/1995 | Hamabe | 455/447 |
| 5,497,504 | 3/1996 | Acampora et al. | 455/63 |
| 5,603,082 | 2/1997 | Hamabe | 455/63 |
| 5,613,200 | 3/1997 | Hamabe | 455/63 |

FOREIGN PATENT DOCUMENTS

| | | |
|---|---|---|
| 0 419-243-A2 | 3/1991 | European Pat. Off. . |
| 0 532 485 A2 | 11/1993 | European Pat. Off. . |
| 0 684 744 A2 | 11/1995 | European Pat. Off. . |
| 0 750 440 A2 | 12/1996 | European Pat. Off. . |
| WO 92/11736 | 7/1992 | WIPO . |
| WO 94/27384 | 11/1994 | WIPO . |
| WO 95/31868 | 11/1995 | WIPO . |

Primary Examiner—Nguyen Vo
Attorney, Agent, or Firm—Jenkens & Gilchrist, P.C.; Robert H. Kelly

[57] ABSTRACT

Circuitry, and an associated method for a multi-user communication system, such as a cellular communication system. Additional communication is selectively permitted in the communication system through operation of the circuitry. Levels of communication quality of ongoing communication in the communication system are determined. When a request is made to admit additional communication, the additional communication is admitted only when the level of communication quality is better than a selected threshold.

24 Claims, 4 Drawing Sheets

METHOD AND CIRCUITRY FOR SELECTIVELY PERMITTING COMMUNICATION IN A MULTI-USER COMMUNICATION SYSTEM

TECHNICAL FIELD OF THE INVENTION

The present invention relates generally to a multi-user communication system, such as a cellular communication system, which permits a plurality of users to concurrently communicate therethrough. More particularly, the present invention relates to a method, and associated circuitry, for selectively permitting additional users to communicate by way of the communication system.

The additional user is permitted access to the communication system only when the levels of communication quality of ongoing communications are bitter than a selected threshold. If the communication quality levels are not met, the additional user is denied access to communicate by way of the communication system. The quality of communication is thereby controlled as the additional user is permitted access to the communication system only when the communication quality levels of ongoing communications are adequate to permit the additional communication. Also, by denying the additional user access to the communication system when the communication quality levels are not met, degradation of communication quality levels of other ongoing calls which might otherwise result if the additional user were permitted access to the communication system is avoided.

BACKGROUND OF THE INVENTION

A communication system is comprised, at a minimum, of a transmitter and a receiver interconnected by a communication channel. Information-containing, communication signals generated by the transmitter are transmitted upon the communication channel to be received by the receiver. The receiver recovers the informational content of the communication signal.

A wireless, or radio, communication system is a type of communication system in which the communication channel is a radio frequency channel defined upon the electromagnetic frequency spectrum. A cellular communication system is exemplary of a wireless communication system. A cellular communication system is further a multi-user communication system which permits concurrent communication by a plurality of different users.

Technological advancements have both lowered the costs and increased the availability and convenience of utilizing a cellular communication system. As a result, increased numbers of users are able to communicate affordably by way of a cellular communication system. Such increased usage has resulted, at times, in capacity problems as, at times, too many users concurrently attempt to communicate by way of the cellular communication system. Attempts have been made to increase the capacities of existing cellular communication systems. By increasing the capacity of a cellular communication system, increased numbers of users are able to communicate concurrently therethrough. Other types of multi-user communication systems have similarly been used by greater numbers of users. And, similar capacity problems exist in such other multi-user systems.

A significant advantage of cellular communication systems is derived from the ability to "re-use" the frequency channels allocated to cellular communications. Because the channels can be re-used, the same frequency channel can be used concurrently at several locations throughout the geographical area encompassed by the cellular communication system to permit several different concurrent telephonic communications between several different users. The different locations throughout the geographical area at which the frequency channels are re-used, however, must be carefully determined. If the frequency channels are re-used at locations which are too close to one another, interference between the concurrently-transmitted signals on the same frequency channels might result.

To minimize the occurrence of co-channel interference, various schemes have been implemented to allocate the frequency channels throughout the geographical area encompassed by the cellular communication system. Adjacent cells of a cellular communication system sometimes do not permit the same frequency channels to be utilized.

In one scheme, a "4/12" frequency re-use plan is utilized. In such a plan, the available frequency channels are divided into twelve groups, and each group is used in only one cell of a group of twelve cells.

To increase the capacity of the cellular communication system, a "⅓" frequency plan can instead be utilized. Utilization of such a plan can significantly increase the capacity of the cellular communication system. In such a plan, the available frequency channels are divided into three groups, and each group is used in only one cell of a group of three cells.

However, use of such a plan increases the possibility that communication quality levels might be degraded as a result of interference between concurrently-transmitted signals. To prevent unacceptable degradation of communication quality levels resulting from utilization of an increased-capacity frequency plan, such as the ⅓ frequency plan, such systems can utilize a "hard-blocking" technique. In a hard-blocking technique, radio base station is constructed to include a limited number of transceiving elements. The number of transceiving elements is selected to ensure that interference problems can be minimized. In such a hard-blocking technique, a maximum number of different communications with a plurality of subscriber units is defined at a particular cell-site by the number of transceivers located at the radio base station which defines the cell in which the subscriber units are positioned. Once such maximum level is reached, additional calls cannot be placed at the cell-site. Viz., the additional calls are blocked. Such a solution, however, can introduce an unnecessarily high amount of call-blocking in some conditions.

A more efficient manner by which to determine whether to admit or to block an additional call would therefore facilitate more efficient usage of the limited spectrum available for cellular communications.

It is in light of this background information related to multi-user communication systems, such as a cellular communication system, that the significant improvements of the present invention have evolved.

SUMMARY OF THE INVENTION

The present invention advantageously provides a method, and associated circuitry, for facilitating efficient utilization of a multi-user communication system, such as a cellular communication system.

Additional users are not automatically precluded from communicating by way of the communication system once a certain number of other users are communicating by way of the communication system. Instead, when an additional user attempts to communicate by way of the multi-user communication system, a determination is made regarding the levels of communication quality of ongoing communications utilizing the communication system.

The additional user is permitted access to communicate by way of a communication system only if the communication quality is better than a threshold level. If the communication quality levels are less than the threshold level, the additional user is denied access to communicate by way of the communication system. Additional communication quality degradation of ongoing communications which might otherwise occur if the additional user were permitted to communicate by way of the communication system is also prevented.

In one aspect of the present invention, a multi-user communication system is formed of a cellular communication system. A user placing a phone call by way of the cellular communication network is permitted only if the levels of communication quality of ongoing calls is better than a selected threshold level. In one embodiment, several different threshold levels are defined. The quality levels of the ongoing calls must be better, for instance, than a first threshold level when the additional user is attempting to initiate a new call, the communication quality levels must be better than a second threshold level when a hand-off of an ongoing call is being requested, and the communication quality levels must be better than a third threshold level when the call is a priority call placed, e.g., to an emergency dispatch center.

In one embodiment, the communication quality levels are determined by determining a cumulative density function representative of carrier-to-interference levels of signals transmitted during operation of the communication system. In another embodiment, the communication quality levels are determined by determining utilization levels of ongoing communications within selected portions of a geographical area encompassed by the cellular communication system. In yet another embodiment, a combination of utilization levels and carrier-to-interference levels are determined to determine the levels of communication quality. Detected error rates, and other measurements of communication quality, can also be used to determine levels of communication quality.

Because the levels of communication quality are used to determine whether additional users are permitted to utilize the communication system rather than merely limiting use to a previously-selected, and hence arbitrary, number of users, a premature rejection of attempts by additional users to communicate by way of the communication system does not occur. Thereby, the communication system can be more efficiently utilized as greater numbers of users are permitted to communicate at acceptable quality levels.

In these and other aspects, therefore, circuitry, and an associated method, selectively permits at least one additional remotely-positioned communication station to communicate with a network communication station. The network communication station is operable to communicate concurrently with a first plurality of remotely-positioned communication stations. Levels of communication quality of communications between the network communication station and the remotely-positioned communication stations of the first plurality of communication stations are determined. The additional remotely-positioned communication station is admitted to communicate with the network communication device responsive to times in which the levels of communication quality are better than a threshold level.

A more complete appreciation of the present invention and the scope thereof can be obtained from the accompanying drawings which are briefly summarized below, the following description of the presently-preferred embodiments of the invention, and the appended claims.

DETAILED DESCRIPTION

Figure 1:
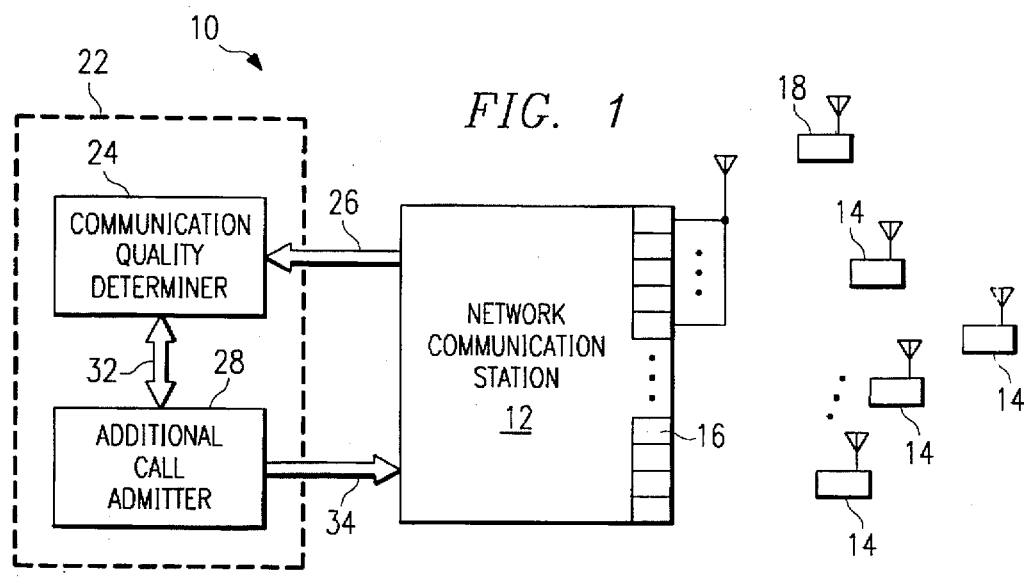
FIG. 1 is a partial functional block, partial schematic diagram of an exemplary communication system in which an embodiment of the present invention is operative.

Referring first to FIG. 1, a multi-user communication system, shown generally at 10, is illustrated. Concurrent communication between a network communication station 12 and a plurality of remotely-positioned communication stations 14 is permitted.

The communication system 10 illustrated in the figure is a wireless communication system in which modulated signals generated at the network communication station 12 are transmitted upon selected channels, such as selected frequency channels or selected time slots of a multiple access transmission scheme. Similarly, signals generated by the communication stations 14 are modulated and transmitted to the network communication station 12.

By appropriate construction of the circuitries of the communication stations 12 and 14 and by appropriate selection of the channels upon which the signals generated by such communication stations are transmitted, full duplex communication between the communication stations 12 and 14 is possible.

The network communication station 12 includes a plurality of transceiving elements 16 wherein individual ones of such elements transmit signals to, and receive signals from, individual ones of the communication stations 14.

As mentioned above, increased usage of various types of communication systems has resulted, at times, in capacity problems. When too many users concurrently utilize a multi-user communication system, interference between concurrently-transmitted signals can cause interference problems which degrade levels of communication quality.

In the conventional art, one way of reducing the possibility of an unacceptable degradation of communication quality is to limit the number of transceiving elements 16 forming a portion of the network communication station 12. By limiting such number of transceiving elements, the capacity of the communication system is correspondingly limited. That is to say, the number of communications permitted in such a system is limited by the number of installed transceiving elements. Such a manner by which to limit the communication capacity of the communication system is sometimes referred to as "hard-blocking."

While a hard-blocking scheme reduces the possibility that too many concurrent users of the communication system might unacceptably degrade levels of communication quality, a hard-blocking scheme in some instances, also prevents the maximization of capacity of the communication system. Transmission channel conditions as well as the positioning of the communication stations can affect the capacity at which the communication system can be operated.

In a hard-blocking scheme, the number of transceiving elements is typically selected during system installation. To prevent the occurrence of unacceptably low communication quality levels during operation of the communication system, the number of transceiving elements is sometimes selected to be lower than that which would regularly be possible in order to most efficiently utilize the frequency spectrum allocated to the system. A communication system utilizing a hard-blocking scheme, therefore, is typically unable to maximize the capacity levels of communications by way of the communication system which are dependent, in significant part, upon, e.g., transmission channel conditions.

With reference again to FIG. 1, for instance, if the communication system 10 were to be constructed utilizing a hard-blocking scheme, once a maximum number of remotely-positioned communication stations 14 concurrently communicate with all of the transceiving elements of the network communication station 12, admission of an additional, remotely-positioned communication station, here communication station 18, would be denied admission to the system. Such denial of admission to communicate in the system would be irrespective of the levels of communication quality of the ongoing communications in the communication system.

The embodiment of the communication system 10 illustrated in FIG. 1 avoids an unnecessary limitation in the capacity of the communication system when the levels of communication quality of ongoing communications permit admission of the additional communication station 18 to communicate in the communication system.

In the communication system 10 shown in FIG. 1, the network communication station 12 includes additional numbers of transceiving elements 16 to permit additional numbers of concurrent communications to occur. The communication station 12 includes a control device 22 forming a portion of, or as illustrated, coupled to, the network communication station 12. The control device 22 includes a communication quality determiner 24 which is coupled, here by way of lines 26, to receive measurement data related to, or other indications of, ongoing communications between the transceiving element 16 of the communication station 12 and the remotely-positioned communication station 14. Responsive to receipt of such information, the communication quality determiner 24 determines levels of communication quality of ongoing communications between the communication stations 12 and 14.

The control device 22 further includes an additional call admitter 28 which is coupled to the communication quality determiner 24 by way of the lines 32. Determined levels of communication quality determined by the determiner 24 are provided to the additional call admitter 28. The admitter 28 generates signals on the lines 34 which is coupled to the communication station 12.

The values of the signals permit the admission, or deny admission, of the additional remotely-positioned communication station 18 to communicate in the communication system. A decision to permit admission, or to deny admission, of the additional communication is made responsive to determined levels of communication quality. If the levels of communication quality of the ongoing communications are adequate, the additional communication is permitted; otherwise, the additional communication is not permitted.

Because a decision is made either to admit, or to deny admission of, the additional communication responsive to actual levels of communication quality of ongoing communications in the communication system, the capacity of the communication system is permitted to be increased if communication conditions permit. An arbitrarily low capacity level defined by a hard-blocking scheme can thereby be avoided, and the communication system can be efficiently operated at higher capacity, when possible. Conversely, of course, a hard-blocking scheme might well permit additional communications even when the level of ongoing communications do not permit the addition of the additional communication.

In one embodiment, the communication quality determiner 24 is provided with information indicative of carrier-to-interference ratios of the ongoing communications between the communication stations 12 and 14. The information may be related to uplink signals generated by the communication station 14 and transmitted to the communication station 12, downlink signals generated by the communication station 12 and transmitted to the communication station 14, or of both the uplink and downlink signals.

Responsive to such indications, the communication quality determiner determines a cumulative density function of the carrier-to-interference ratios and provides information related to such determined function to the additional call admitter 28. If the cumulative density function indicates that the levels of communication quality are better than a threshold level, the additional call admitter 28 generates signals on lines 34 to permit an increase in the communication capacity of the communication system.

Viz., when a request is made for additional communication by additional numbers of remotely-positioned communication stations, such as the communication station 18, the additional communication is permitted. If the determined level of communication quality is not greater than the threshold level, additional communication is not permitted, and a request for communication with, or by, an additional, remotely-positioned communication station is denied.

In another embodiment in which the communication system 10 forms a digital communication system, error rates, such as detected bit error rates or frame error rates are supplied to the control device 22 by way of the lines 26. In analogous fashion, the communication quality determiner determines levels of communication quality of the ongoing communications in the communication system responsive to such information, and the additional call admitter 28 permits, or denies, admission of additional communications in the communication system.

In like fashion, other information and data can be supplied to the communication quality determiner 24 in other embodiments, the levels of communication quality can similarly be determined, and decisions to permit or deny admission of additional communications in the communication system can be made.

Operation of an embodiment of the present invention in a cellular communication system permits an increase in the capacity of the communication system. Decisions can be made on a cell-by-cell basis to permit increased numbers of concurrent communications in such cells.

When the communication quality level of ongoing communications in a cell of the cellular communication system is great enough to permit additional numbers of calls, if a request to admit an additional call in the network is made, the request is granted. The additional call in the cell is admitted and the additional communication is effectuated. The number of concurrent calls permitted is dependent upon the communication quality levels of ongoing communications rather than, as when a hard-blocking scheme is utilized, being limited by the number of transceivers positioned at a radio base station. The capacity of the limited frequency spectrum allocated for cellular communications can be more efficiently utilized as greater numbers of users can communicate concurrently when communication quality levels so permit.

Figure 2:
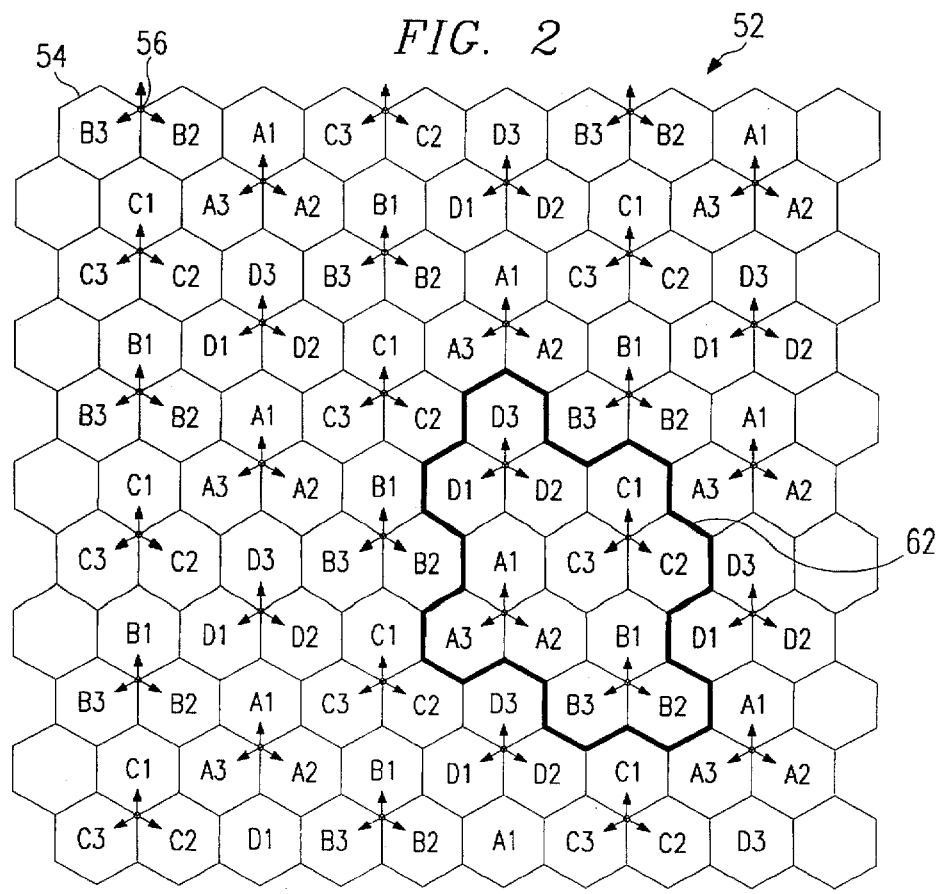
FIG. 2 is a geometric representation of an arrangement of cells defined in a cellular communication system and the allocation of groups of frequency channels amongst the cells.

FIG. 2 illustrates an exemplary grid pattern, shown generally at 52. Hexagonally-shaped cells 54 are defined by radio base stations 56. In the arrangement illustrated in FIG. 2, each radio base station 56 defines three cells 54. Subscriber units positioned in any of the cells transmits signals to, and receives signals from, the radio station 56 which defines the cell 54 in which the subscriber unit is positioned. As the subscriber unit travels through the geographical area encompassed by the cellular communication system, an ongoing call of the subscriber unit can be handed-off from one radio base station 56 to another without apparent interruption of the ongoing call.

As noted previously, a significant advantage of a cellular communication system results from the ability to re-use the channels allocated to the communication system. Different channels are assigned at different cells, and such channel assignments are repeated in various ones of the cells. Typically, channel assignments for adjacent cells are dissimilar to minimize the effects of co-channel interference.

The grid pattern 52 shown in FIG. 2 is sometimes referred to as a "4/12" scheme. In such a scheme, the channels allocated to the cellular communication system are divided into twelve groups, here designated by A1, A2, A3, B1, B2, B3, C1, C2, C3, D1, D2, and D3. Groups of twelve cells, such as the group 62 indicated by the bold-faced outline in the figure, are defined throughout the grid pattern. The channels assigned to each cell of the twelve-cell group is assigned a different set of channels, and adjacently-positioned cells are not assigned with the same channels. Interference between signals generated in adjacently-positioned cells is thereby reduced.

To increase the capacity of the cellular communication system, the cells can be re-used more frequently, albeit at the risk of an increase in the possibility that interference of concurrently-generated communication signals might occur.

Figure 3:
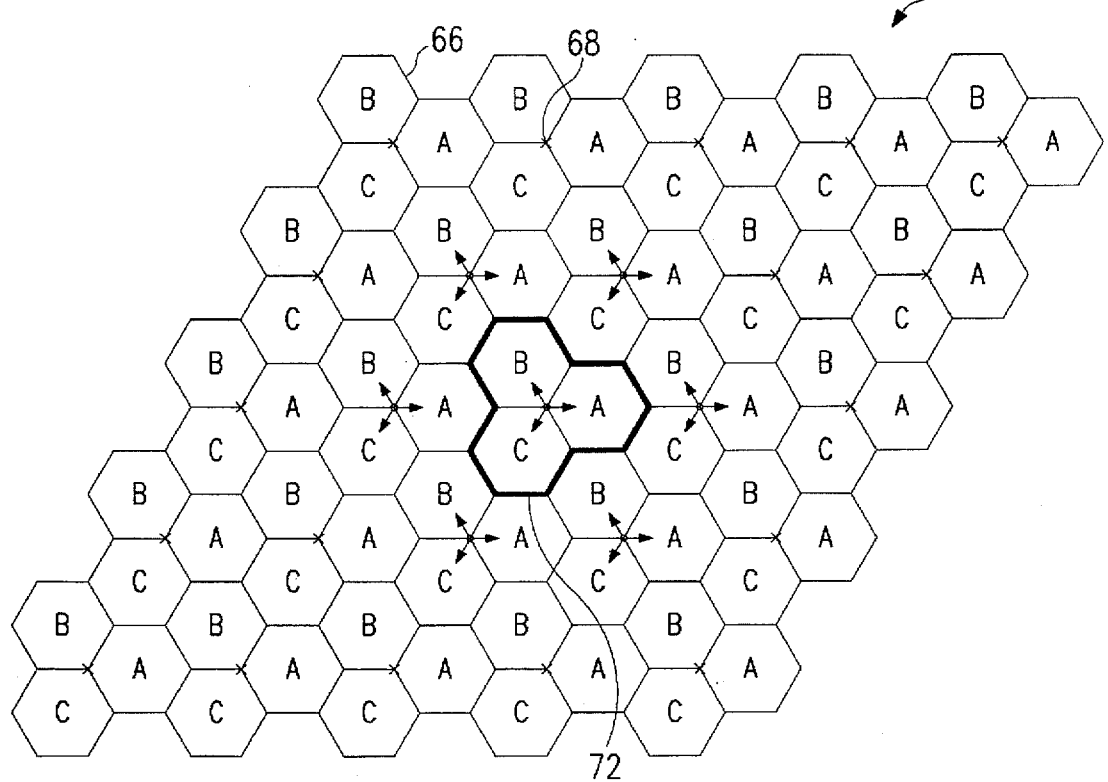
FIG. 3 is a graphical representation, similar to that shown in FIG. 2, but which illustrates another arrangement of cells defined throughout a geographical area and the allocation of groups of frequency channels amongst the cells.

FIG. 3 illustrates the grid pattern, shown generally at 64, sometimes referred to as a "1/3" scheme. Similar to the arrangement shown in FIG. 2, hexagonally-shaped cells, here cells 66, are defined by radio base stations 68. Each base station 68 defines three cells 66, analogous to the base stations 56 which define the cells 54 in the illustration of FIG. 2.

In a 1/3 scheme, the channels allocated to the cellular communication system are divided into three groups. And, three groups of cells, such as the group 72, indicated by the bold-faced outline are formed in which each cell of the group is assigned with a different one of the three sets of allocated channels. The sets of channels are assigned in manner such that adjacent ones of the cells are not assigned with the same set of frequency channels.

Because the allocated channels are divided into three sets of channels rather than twelve sets of channels, a multiple-increase in channels available at any particular cell for the transmission of communication signals results. However, the separation distance between cells which re-use the same set of channels is reduced, in contrast to the re-use pattern of the 4/12 scheme shown in FIG. 2.

Degradation of levels of communication quality resulting from co-channel interference is potentially a greater concern in a cellular communication system utilizing the 1/3 scheme than the 4/12 scheme. Other types of interference, such as adjacent-channel interference, is again possible, and degradation of the levels of communication quality can also occur. Hence, although interference problems might cause the degradation of levels of communication quality in a cellular communication system having either the grid pattern 52 or the grid pattern 64, as well as other grid pattern arrangements, the channel re-use plan of the arrangement illustrated in FIG. 3, is particularly susceptible to interference problems due to the proximity between cells which are assigned with the same sets of channels.

As mentioned previously with respect to the communication system 10 shown in FIG. 1, hard-blocking schemes can be utilized in communication systems. Use of a hard-blocking scheme prevents more than a selected number of concurrent communications from occurring. Thereby the possibility that interference between concurrently-generated signals can degrade the levels of communication qualities of ongoing communications beneath an acceptable level is reduced. However, hard-blocking schemes are inherently arbitrary as such schemes are unable to take into account actual interference levels which might vary at different times.

A manner by which to admit, or to deny, an additional call between a subscriber unit positioned in a cell and a radio base station which defines the cell based on the level of communication quality of ongoing communications in an area proximate to the subscriber unit would therefore be advantageous as operation of the communication system could be more efficiently utilized.

Figure 4:
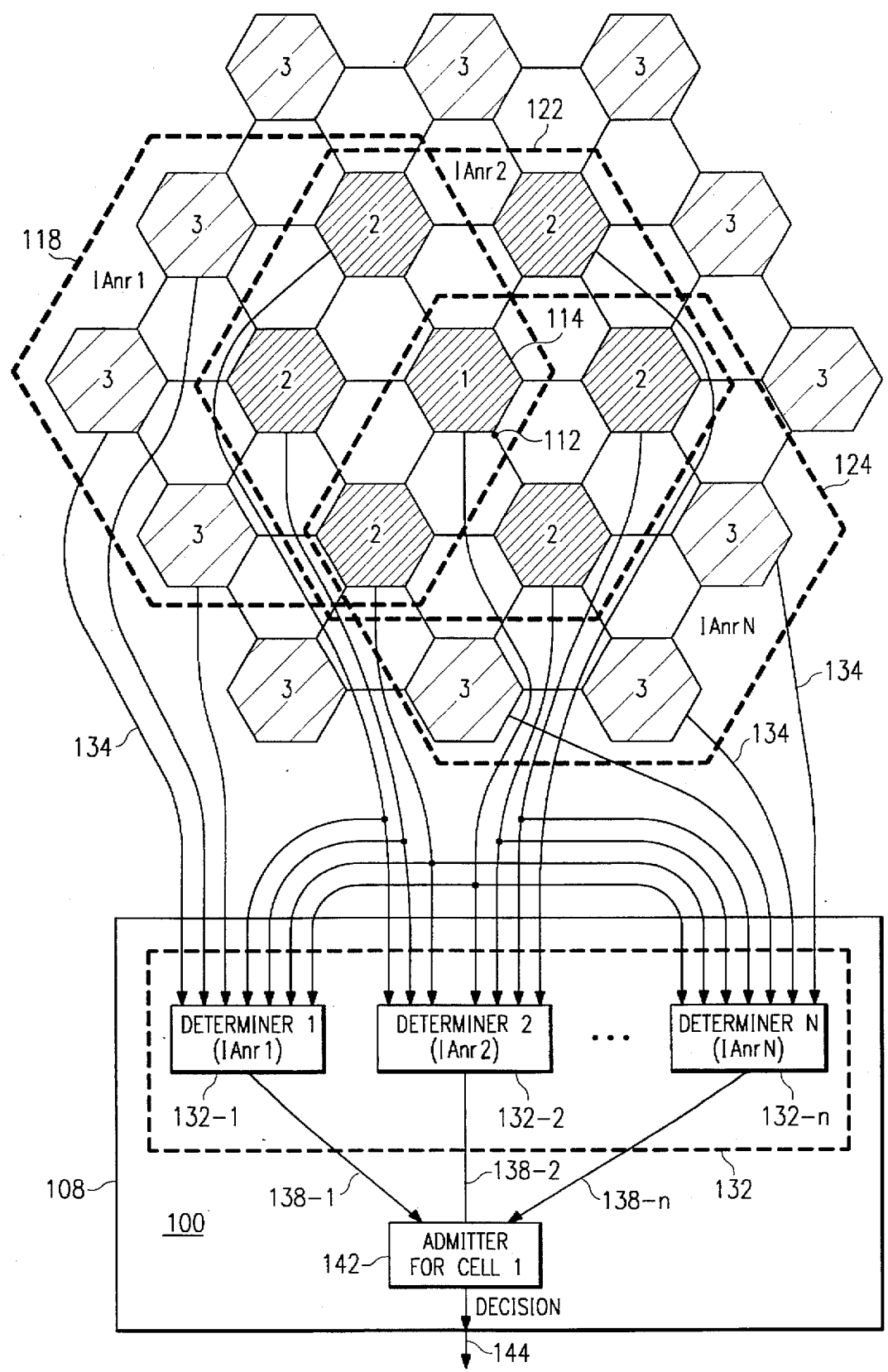
FIG. 4 is a diagram which illustrates a portion of a cellular communication system which utilizes an embodiment of the present invention.

Turning next to FIG. 4, the circuitry, shown generally at 100, of an embodiment of the present invention is pictured together with a plurality of cells defined in a cellular communication system. The circuitry 100 of the embodiment illustrated in the figure is positioned at a mobile switching center 108 to form a portion thereof. In an embodiment in which the cellular communication system comprises e.g., a Group Special Mobile (GSM) system, the circuitry 100 can instead be positioned at a base station controller. The circuitry 100 may advantageously be formed of processing circuitry having algorithms executable therein to perform the desired functions of the circuitry.

The circuitry 100 shown in the figure is operative to control the number of concurrent communications permitted between subscriber units and a radio base station 112 which defines a cell 114. In the figure, the cell 114 is the centrally-positioned cell. Analogous such circuitry is positioned at the mobile switching center 108 to perform similar functions to control communications and other cells of the cellular communication system. For purposes of simplicity, such analogous other circuitry is not illustrated in the figure.

The channels assigned to the cells of the portion of the cellular communication system shown in the Figure are assigned according to a 1/3 scheme, described previously with respect to FIG. 3. The assignment of channels according to this scheme is exemplary in nature, and the circuitry 100 can be utilized in a cellular communication system in which channels are assigned to cells according to other schemes.

The cells are defined by radio base stations. Again, each radio base station defines three cells. Again, and as described previously, the channels allocated for the cellular communication system are divided into three sets, such sets being identified by A, B, and C. Again, adjacently-positioned cells are not assigned with the same sets of channels, but cells assigned with the same sets of channels are spaced apart by one-cell distances.

Groups of cells to which the same sets of channels are assigned form interference areas. In the figure, three interference areas, a first interference area 118, a second interference area 122, and an nth interference area 124 are indicated in the figure. Each interference area 118, 122, and 124 includes the cells assigned with the "A" sets of channels positioned within the respective hexagonal blocks, shown in dash. Examination of the interference areas 118, 122, and 124 indicates that seven cells form each of the interference areas, 118, 122, and 124. Examination of the interference areas 118, 122, and 124 further indicates that the cell 114 forms a portion of all three of the indicated interference areas, 118, 122, and 124.

For reasons of simplicity, additional interference areas are not separately indicated in the figure. Analysis of the manner by which the interference areas are formed reveals that the cell 114 forms a portion of seven separate interference areas. It may similarly be shown that other cells form portions of seven separate analogously-defined interference areas.

In other embodiments, interference areas can be defined in other manners. For instance, groups of adjacently-positioned cells can instead define the interference areas. Or, groups of cells having dissimilar, but related channels can instead together form interference areas. The interference areas may further be defined to be single cells.

The circuitry 100 includes a signal quality determiner 132 formed of a plurality of elements, here elements 132-1, 132-2, . . . 132-n. The number of elements correspond to the number of interference areas, here seven, of which a cell, here the cell 114, forms a portion.

The first element 132-1 is coupled to the base stations which define the cells of the interference area 118 by way of selected ones of the lines 134 extending to the respective ones of the base stations.

Analogously, the element 132-2 is coupled to the radio base stations which define the cells forming the second interference area 122, again by way of selected ones of the lines 134 extending to the respective ones of the base stations which define such cells.

The nth element 132-n is coupled to the radio base stations of the nth interference area 124, again by way of selected ones of the lines 134 extending to the respective ones of the radio base stations which define the cells of the interference area 124.

Others of the elements, for purposes of simplicity, not shown in the figure, are analogously coupled to the radio base stations which define the cells forming the other interference areas.

The radio base stations transmit informational data to the elements to which the respective ones of the radio base stations are coupled. As is indicated in the figure, the lines 134 extending from the respective ones of the radio base stations are each coupled to a plurality of elements 132-1 through 132-n.

In one embodiment, the information supplied by the radio base stations to the elements of the communication quality determiner 132 comprises data related to levels of interference introduced upon signals transmitted between subscriber units and the radio base stations in which the subscriber units are positioned.

In a cellular communication system, information related to carrier-to-interference ratios may be transmitted by the radio base stations to the determiner 132. The information related to the interference may be representative of detected levels of interference introduced upon uplink signals transmitted by the subscriber units to the base stations, indications of interference introduced upon downlink signals transmitted by the base stations to the subscriber units, or indications of interference introduced upon both uplink and downlink signals.

In a digital communication system, e.g., indications of error rates, such as bit error rates or frame error rates can be supplied by the radio base stations to the communication quality determiner 132. In a group special mobile (GSM) system, indications of RxQual values can be supplied by the radio base stations to the elements of the determiner 132. Alternative indications may be supplied to the determiner 132, if desired. In another embodiment, utilization levels are determined and compared against a threshold.

Utilization levels may also be determined and then selectively weighted. In such an embodiment, utilization of selected channels are weighted with a weighting value and the weighted utilization level is compared against a threshold. For instance, the number of ongoing calls can be determined as well as the call-type of each of the ongoing calls. Certain of the call-types are more heavily weighted than others. For example, a packet-data call might be more heavily weighted than other types of calls as a packet-data call might generate a greater level of interference. The weighted summation of ongoing calls can then be divided by the number of calls feasible within, e.g., a cell or interference area. If the resultant value is less than a threshold value, an additional call is permitted; otherwise an additional call is not permitted.

Each element 132-1 through 132-n is operative to determine levels of communication quality of ongoing communications in the interference area to which the element is coupled to receive information. In one embodiment, each element 132-1 through 132-n calculates cumulative density functions responsive to the information supplied thereto.

Levels of communication quality determined by the elements 132-1 through 132-n of the determiner 132 are supplied by way of lines 138-1, 138-2, . . . 138-n to an additional-call admitter 142. The admitter 142 is operative to compare the determined levels determined by the elements 132-1 through 132-n against a threshold value. Responsive to such comparisons, the additional-call admitter generates a decision signal on line 144 which is supplied to the radio base station 112 which defines the cell 114. The decision signal is an indication either to permit admission, or deny admission, of additional calls between subscriber units positioned in the cell 114 and the radio base station 112. When a request is made within the cell 114 to place an additional call, the call is admitted, or denied admission, responsive to the value of the decision signal generated on the line 144.

In one embodiment, the additional-call admitter 142 generates a decision signal to admit an additional call when any of the elements 132-1 through 132-n generates a signal which is greater than the threshold value. In other embodiments, the values of the signals generated by all of the elements 132-1 through 132-n must be greater than the threshold value, and in yet other embodiments, various combinations of the values must be better than the threshold value.

Irrespective of the manner by which the additional-call admitter 142 determines whether to admit, or to deny admission to an additional call placed in the cell 114, the decision is based upon determinations of the level of communication quality of ongoing calls in areas positioned in, and about, the cell 114. Arbitrary limits on the number of concurrent calls permitted in the cell 114 does not occur.

In further embodiments of the present invention, the threshold value utilized by the additional-call admitter 142 is dependent upon the type of call which might be requested to be admitted in the cell 114. For instance, a priority call, such as an emergency call, is admitted if the communication quality levels are better than a first threshold, a hand-off of an ongoing call from another cell is admitted if the levels of communication quality are better than a second threshold, and a request to admit a new call is admitted if the determined level of communication quality is better than a third threshold.

Figure 5:
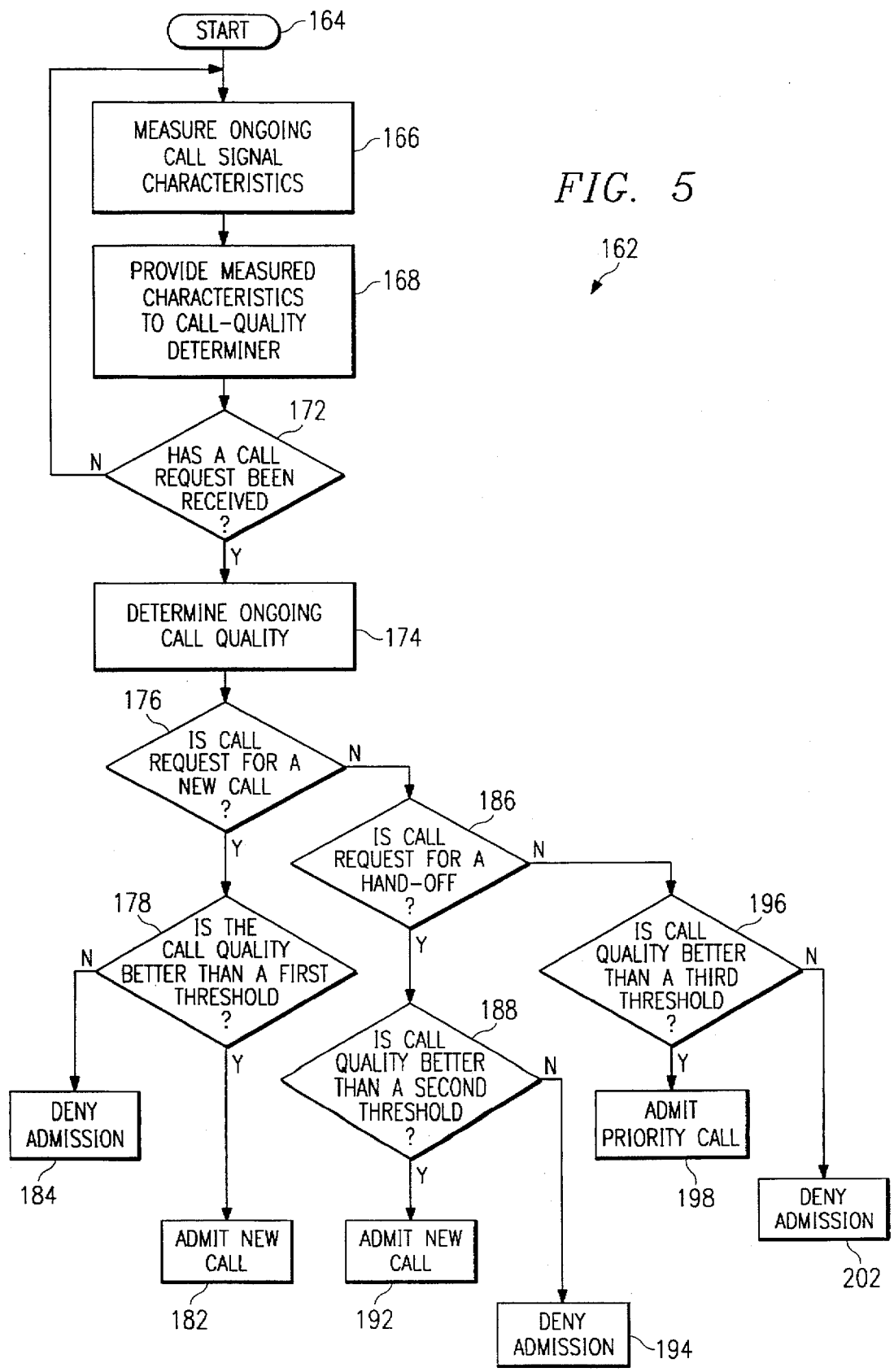
FIG. 5 is a flow diagram which illustrates operation of an embodiment of the present invention.

FIG. 5 illustrates a method, shown generally at 162, of operation of an embodiment of the present invention to selectively admit additional calls in a cell of a cellular communication system. The method 162 may, for example, be effectuated by the circuitry 100 described with respect to FIG. 4.

First, after start of the method, as indicated by the start block 164, ongoing call signal characteristics are measured, as indicated by the block 166. The ongoing call signal characteristics may be of characteristics indicative of levels of interference, carrier-to-interference levels, bit error rates, frame error rates, or other measured signal characteristics.

Then, and as indicated by the block 168, the measurement characteristics are provided to a call-quality determiner, such as the determiner 132 shown in FIG. 4. A determination is then made, as indicated by the decision block 172, as to whether a call request has been received. If not, the no branch is taken back to the block 166. Otherwise, the yes branch is taken to block 174 and the ongoing call quality is determined. In the circuitry 100 illustrated in FIG. 4, the ongoing call quality is determined by a plurality of determining elements, as described previously with respect to FIG. 4.

Thereafter, and as indicated by the decision block 176, a determination is made as to whether the call request is to request admission of a new call. If so, the yes branch is taken to decision block 178, and a determination is made as to whether the call quality is better than a first threshold. If so, the yes branch is taken and a new call is admitted. Otherwise, the no branch is taken and admission of the additional call is denied.

If the no branch is taken from the decision block 176, a determination is then made, as indicated by the decision block 186, as to whether the call request is for a hand-off of an ongoing call at another cell. If so, the yes branch is taken to the decision block 188, and a determination is made as to whether the call quality is better than a second threshold. If so, the yes branch is taken to the block 192, and the new call is admitted. Otherwise, the no branch is taken to the block 194, and the call is denied admission to the system.

If the no branch is taken from the decision block 186, a determination is then made, as indicated by the decision block 196, as to whether the call quality is better than a third threshold. If so, the yes branch is taken to the block 198, and the new call, here a priority call, is admitted. Otherwise, the no branch is taken to the block 202, and the call is denied admission.

The method 162 permits a decision to be made as to whether to admit a call to the communication system based upon the communication quality levels of ongoing communications. Because the determination is based upon actual communication quality levels, a premature rejection of a request to admit an additional call can be avoided. And, by comparing the determined communication quality levels against several thresholds, requests for different types of calls can be treated differently.

In the various embodiments of the present invention, additional users to a multi-user communication system are not automatically precluded from communicating by way of the communication system once a preselected number of concurrent communications has been reached. Instead, when an additional user attempts to communicate by way of the multi-user communication system, a determination is made regarding the levels of communication quality of ongoing communications. The decision to admit, or to deny admission, is made responsive to actual communications conditions and not a preselected, and hence arbitrary, number.

The previous descriptions are of preferred examples for implementing the invention, and the scope of the invention should not necessarily be limited by this description. The scope of the present invention is defined by the following claims.

What is claimed is:

1. In a cellular communication system having radio base stations, the radio base stations defining cells and operable to communicate with subscriber units positioned within cells defined by the radio base stations, an improvement of circuitry for selectively admitting an additional subscriber unit positioned in a selected cell to communicate with a selected radio base station which defines the selected cell, the selected cell defining a portion of partially-overlapping interference areas, the interference areas each formed of a set of associated cells, said circuitry comprising:

a plurality of communication quality determiners, each communication quality determiner coupled to the radio base stations defining the cells of the interference areas associated therewith to receive indications of ongoing communications of subscriber units in the cells of the interference area, each communication quality determiner for determining levels of communication quality of ongoing communications of subscriber units within the cells of the interference area associated therewith; and an additional-call admitter associated with the selected cell and coupled to each of said plurality of communication quality determiners associated with interference areas of which the selected cell forms a portion, said additional-call admitter for admitting the additional subscriber unit to communicate with the selected radio base station when levels of communication quality determined by at least one of the communication quality determiners coupled thereto is better than a threshold level.

2. The circuitry of claim 1 wherein a set of communication channels is allocated for use by the cellular communication system, wherein a group of cells is allocated with a subset of the set of communication channels, and wherein the interference areas are formed of cells which are allocated with the subset.

3. The circuitry of claim 1 wherein the interference areas are formed of a plurality of cells positioned proximate to one another.

4. The circuitry of claim 1 wherein a set of communication channels is allocated for use by the cellular communication system, a first subset of the set allocated for use at the selected cell and a second subset of the set allocated for use at a second set of cells, and wherein the interference areas are formed of the selected cell and selected combinations of the second set of cells.

5. The circuitry of claim 1 wherein said communication quality determiner associated with each interference area is coupled to receive indications of error rates of the ongoing communications of the subscriber units within the cells of the interference area associated therewith.

6. The circuitry of claim 5 wherein the indications of error rates comprise indications of bit error rates.

7. The circuitry of claim 5 wherein the indications of error rates comprise indications of frame error rates.

8. The circuitry of claim 1 wherein said communication quality determiner associated with each interference area is coupled to receive indications of levels of interference introduced during the ongoing communications of the subscriber units within the cells of the interference area associated therewith.

9. The circuitry of claim 1 wherein said communication quality determiner associated with each interference area is coupled to receive indications of carrier-to-interference levels introduced during the ongoing communications of the subscriber units within the cells of the interference area associated therewith.

10. The circuitry of claim 1 wherein the ongoing communications comprise downlink signals generated by radio base stations defining the cells of the interference areas and wherein said communication quality determiner associated with each interference area is coupled to receive data related to the downlink signals.

11. The circuitry of claim 1 wherein the ongoing communications comprise uplink signals generated by the subscriber units positioned within the cells of the interference areas and wherein said communication quality determiner associated with each interference area is coupled to receive data related to the uplink signals.

12. The circuitry of claim 1 wherein said communication quality determiner associated with each interference area is coupled to receive data related to the ongoing communications in the cells of the interference area, each of said communication quality determiners for determining a cumulative density function responsive thereto.

13. The circuitry of claim 1 wherein said additional-call admitter admits the additional subscriber unit when at least a selected percentage of the ongoing communication within at least one of the interference areas of which the cell associated therewith forms a portion is better than the threshold level.

14. The circuitry of claim 1 wherein the cellular communication system includes a mobile switching center and wherein said communication quality determiners and said additional-call admitter form portions of the mobile switching center.

15. The circuitry of claim 1 wherein the cellular communication system includes a base station controller and wherein said communication quality determiners and said additional-call admitter form portions of the base station controller.

16. The circuitry of claim 1 wherein said communication quality determiners comprise processing circuitry having algorithms executable therein for determining the levels of the communication quality.

17. The circuitry of claim 1 wherein said additional-call admitter comprises processing circuitry having algorithms executable therein for admitting the additional number of subscriber units.

18. The circuitry of claim 1 wherein the levels of the communication quality determined by each of said communication quality determiners comprises utilization levels representative of levels of ongoing communication and wherein said admitter admits the additional subscriber unit when the utilization levels determined by at least one of said determiners is within the threshold level.

19. The circuitry of claim 18 wherein the utilization levels of selected channels upon which communication is ongoing are weighted and wherein said admitter admits the additional subscriber unit when weighted utilization levels determined by at least one of said determiners is within the threshold level.

20. The circuitry of claim 1 wherein the interference area comprise a first interference area encompassing a first set of cells defined by a first set of radio base stations and a second interference area encompassing a second set of cells defined by a second set of radio base stations, wherein the selected radio base station defines a cell positioned in both the first and second interference areas, and wherein said additional-call admitter admits the additional subscriber unit when the utilization levels determined by said communication quality determiner of at least one of the first and second two interference areas, respectively, is within the threshold level.

21. The circuitry of claim 1 wherein the threshold level utilized by said additional-call admitter is of a first value when an additional subscriber unit initiates a new call with the selected radio base station.

22. The circuitry of claim 21 wherein the threshold level utilized by said additional-call admitter is of a second value when the additional subscriber unit is in ongoing communication and communications with the additional subscriber unit are to be handed-off to the selected radio base station.

23. The circuitry of claim 1 wherein the cellular communication system comprises a Group Special Mobile communication system and wherein said communication quality determiners determine levels of RxQual of the ongoing communication.

24. A method for selectively permitting at least one additional remotely-positioned communication station positioned in a selected cell to communicate with a selected network communication station which defines the selected cell, the network communication station operable to communicate concurrently with a first plurality of remotely-positioned communication stations, the selected network communication station is one of a plurality of network communication stations, each defining a cell, the selected cell forming a portion of partially-overlapping interference areas, said method comprising the steps of:

determining levels of communication quality of ongoing communications between the network communication stations and remotely-positioned communication stations of the first plurality of communication stations within cells of each of the interference areas of which the selected cell forms a portion; and admitting the additional remotely-positioned communication station to communicate with the selected network communication station when the levels of communication quality determined during said step of determining in at last one of the interference areas is better than a threshold level.

* * * * *